April 25, 1950 M. E. ROTH 2,505,651
SAFETY LOCK FOR SLIDING AIRCRAFT COCKPIT CANOPIES
Filed July 22, 1947 2 Sheets-Sheet 1
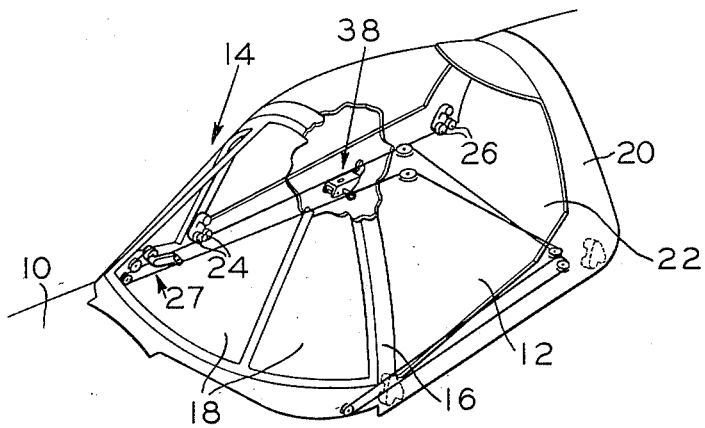
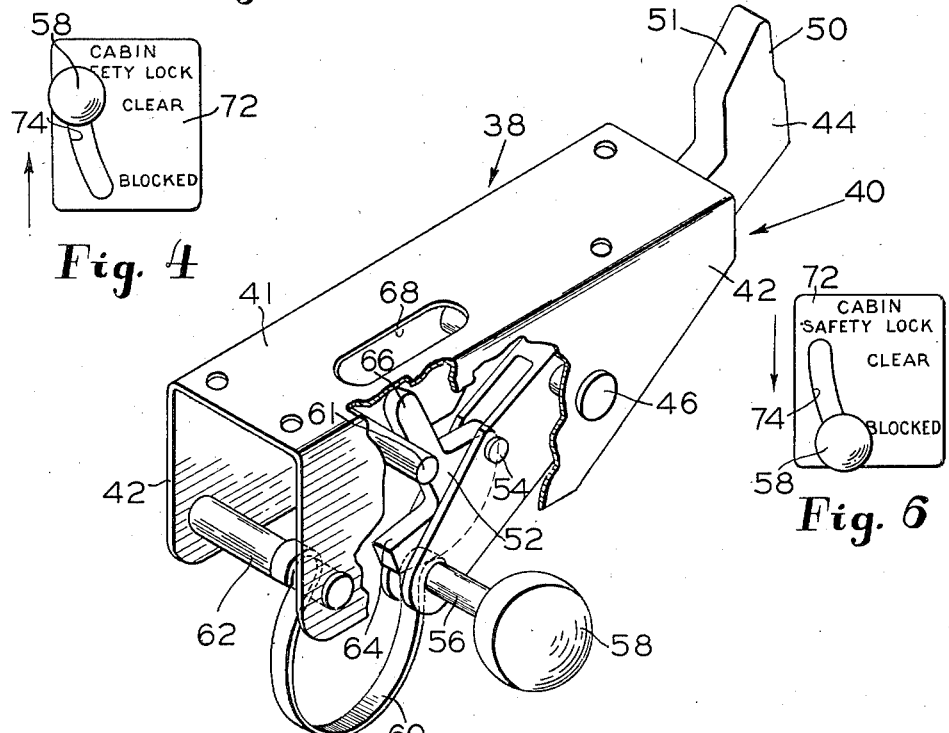
INVENTOR.
Morris E. Roth
BY M. B. Tasker
ATTORNEY

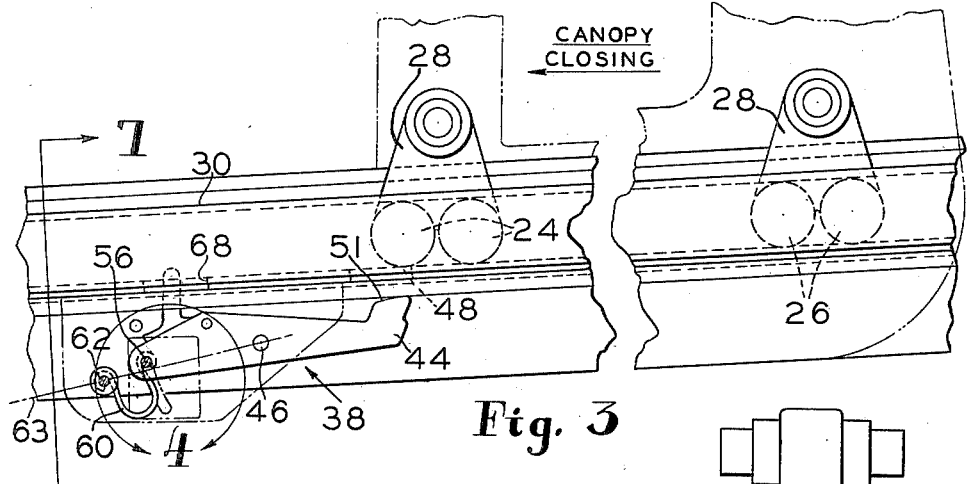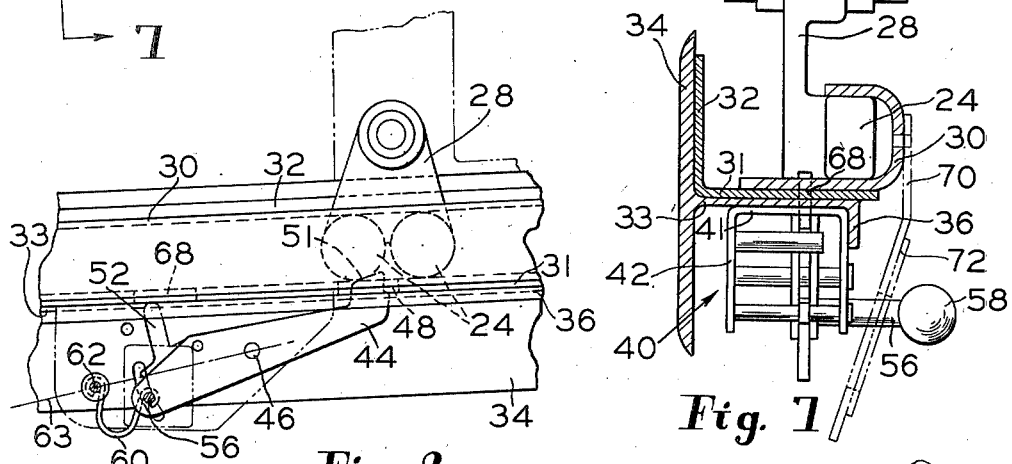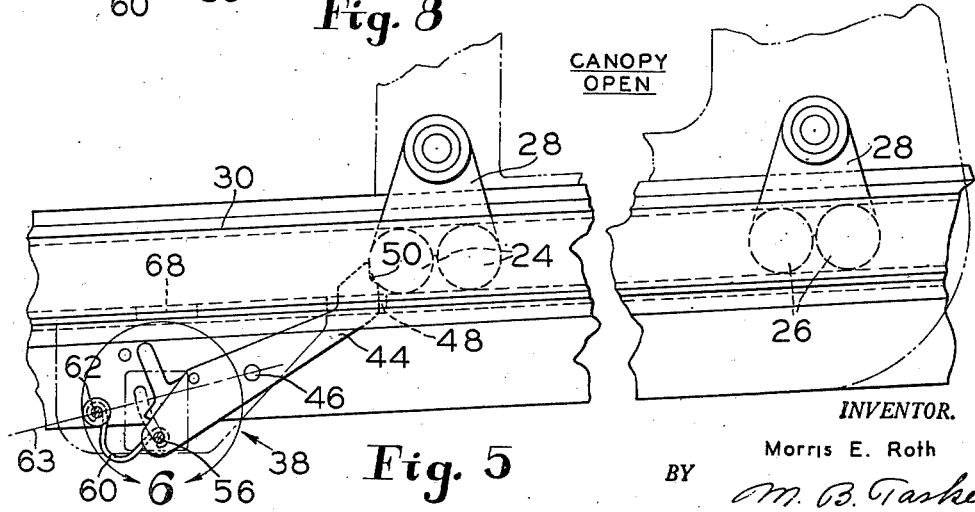

Patented Apr. 25, 1950

2,505,651

UNITED STATES PATENT OFFICE 2,505,651

SAFETY LOCK FOR SLIDING AIRCRAFT COCKPIT CANOPIES

Morris E. Roth, Stratford, Conn., assignor to United Aircraft Corporation, East Hartford, Conn., a corporation of Delaware Application July 22, 1947, Serial No. 762,725

7 Claims. (Cl. 244—121)

1

This invention relates to aircraft and particularly to cockpit cabin safety locks.

When an airplane pilot is making a landing it is desirable to have the cockpit cabin sliding section in the full open position so that the pilot can get out of the cabin quickly in the event of a crash. Cockpit cabin sliding sections are moved either manually or mechanically between open and closed positions and usually have a lock which operates as a function of the sliding section actuating mechanism. This lock has frequently failed and as a result the canopy has slammed shut and jammed when a violent landing was made.

It is an object of this invention to provide improved locking means for securing a cockpit cabin sliding section in the open position.

More specifically it is an object of the invention to provide a locking mechanism by which the sliding section of the cabin is locked automatically and positively in the open position by locking means which require manual control before the cabin sliding section can move to closed position.

A further object of the invention is to provide locking means of the above type which is automatically conditioned as a result of closing movement of the sliding section by its actuating mechanism to lock the cabin sliding section when it is again fully opened.

A still further object of the invention is generally to improve the construction and performance of cockpit cabin safety locks.

These and other objects and advantages of the invention will be pointed out herein or will become apparent from the following detailed description of the accompanying drawings which illustrate one embodiment which the invention may assume in practice.

In these drawings,

Fig. 1 is a fragmentary perspective view of an airplane in the vicinity of the cockpit showing a sliding canopy section and equipped with the improved locking mechanism of this invention;

Fig. 2 is a perspective view of the locking mechanism on an enlarged scale with parts broken away to facilitate illustration;

Fig. 3 is a somewhat diagrammatic side elevation showing the relation of the locking mechanism to the canopy guide wheels as the canopy moves from open to closed position following manual release of the lock;

Fig. 4 is an enlarged detail of the manual operating member and the cooperating name plate in the position of the parts shown in Fig. 3;

Fig. 5 is a view similar to Fig. 3 showing the parts in the position in which the canopy sliding section is positively locked in open position;

2

Fig. 6 is an enlarged detail of the manual operating member and name plate in the position of the parts shown in Fig. 5;

Fig. 7 is a section taken on line 7—7 of Fig. 3 looking aft; and

Fig. 8 is a view similar to Fig. 3 showing the canopy guide wheels depressing the locking mechanism.

Referring to Fig. 1, 10 indicates the fuselage of an airplane having a cockpit 12, the open top of which is closed by a canopy generally indicated at 14. The canopy includes a fixed forward section comprising a frame 16 for the usual molded plastic windshield members 18 and a cooperating horizontally slidable section comprising a frame 20 for the transparent plastic member 22. The movable section also includes fore and aft sets of wheels 24 and 26 on each side of the canopy on which the latter is slidable forward into engagement with the windshield section to cover the cockpit and aft to open the same. Manually operable means are provided for sliding the movable canopy section toward and away from the fixed section including the usual pilot operated crank and cable mechanism generally indicated at 27, mounted on the lower end of a bracket 28 carried by frame 20 and these wheels run in confronting channel shaped tracks 30 mounted on opposite sides of the cockpit. As shown in Fig. 7 these tracks are mounted on the horizontal legs 31 of structural angles 32 which in turn are secured to the horizontal webs of T-shaped structural members 34 which extend fore and aft in the airplane along both sides of the cockpit. The webs 33 are provided with inner depending flanges 36 which support and locate the safety lock with which this invention is particularly concerned and which is generally indicated in Figs. 1 and 2 by the numeral 38.

As shown in Fig. 7, the safety lock mechanism is mounted on the member 34 which extends along the right-hand cockpit wall and includes (Fig. 2) an inverted channel shaped bracket 40 which is secured by suitable bolts (not shown) to the web 33 of member 34. Bracket 40 has a web 41 and depending parallel flanges 42 the innermost of which abuts the flange 36 on member 34 (Fig. 7) and locates the bracket 40 and the locking mechanism carried thereby beneath the wheel brackets 28. The locking mechanism further includes a stop member, or lever, 44 located between flanges 42 which is fulcrumed intermediate its ends on a pin 46 supported in flanges 42. Stop member 44 extends aft of bracket 40 and projects above the web 41 and through a passage 48 in web 33, leg 31 and the lower leg of channel 30 into a position in which its upstanding end is in front of wheel bracket 28 of the forward set of wheels 24, as shown in Fig. 5. In this position the canopy 14 is positively locked in its open position by the engagement of bracket 30 with abutment face 50 of lever 44. Lever 44 is also provided with an adjacent abutment face 51 the purpose of which will later appear.

The stop lever 44 is bifurcated at its forward end to receive a trip member 52 pivoted on a pin 54 fixed in lever 44 and also carries a rigid shaft 56 projecting inwardly into the cockpit and provided with a knob 58 on its innermost end in position to be grasped by the pilot. A flat tension spring 60 extends between the furcations of lever 44 and is pivotally attached to shaft 56 by having its end coiled about the short section of shaft 56 between said furcations. The other end of the spring 60 is similarly coiled about a pin 62 which extends between the depending flanges 42 of bracket 40 adjacent the forward end of this bracket. It will be noted that the axis of shaft 56 in the down, or blocked, position of knob 58 shown in Figs. 5 and 6 is located below a straight line 63 connecting pins 46 and 62, whereas the shaft 56 is above this line in the up, or clear, position of the knob 58 shown in Figs. 3 and 4. Thus it will be evident that the spring 60 acts to hold the lever 44 in either its up or its down position whenever it is moved into either position by the knob 58.

The trip lever 52 has a forwardly extended toe 64 (Fig. 2) which overlies the coiled end of spring 60 on shaft 56 and is further provided with an upstanding trip arm 66 which in the down position of knob 58 is depressed below the web 41 of bracket 40 into engagement with a stop pin 61. However, in the up position of knob 58, trip arm 66 projects through aperture 68 in web 41 and aligned flanges in web 33, leg 31, and the lower flange of channel 30 into a position in which it can be engaged by the wheel bracket 28 of wheels 24 (Fig. 7) carried by the canopy sliding section as the latter is rolled forward into the closed position.

In order that the pilot may readily determine visually the position of the locking mechanism, a name plate support 70 is secured to the vertical web of channel 30 and a name plate 72 is fixed thereto, through both of which the shaft 56 extends as shown most clearly in Fig. 7. The name plate and its supporting plate are provided with an arcuate slot 74 in which the shaft 56 moves as the stop lever 44 moves about its pivot 46. The upper position of the knob 58 in which this abutment is projected into the channel 30 in front of the wheel bracket 28 is marked "Blocked."

Assuming that the canopy 14 is in the closed position and the locking mechanism is in its normal "Blocked" position shown in Fig. 2, if the pilot wishes to open the canopy sliding section preparatory to landing, he operates the canopy actuating mechanism 27 to move the canopy aft during which movement the wheels 24 and the associated bracket 28 move along the channel 30 past the upstanding end of lever 44, the bracket engaging the inclined surface 51 on the lever and depressing the same as shown in Fig. 8. It will be noted, however, from an inspection of Fig. 8 that as bracket 28 passes over surface 51 the axis of shaft 56 will still be below the dot and dash line 63 so that as the bracket 28 clears the abutment end of lever 44, the latter will return under action of spring 60 to the "Blocked position shown in Fig. 5 in which the abutment face 50 is in front of bracket 28 and positively blocks the forward movement of this bracket and consequently of the movable canopy section by which it is carried. Regardless of how violent the landing, the shaft 56 will remain at the bottom of slot 74 and lever 44 will remain in canopy blocking position.

Following takeoff, if the pilot wishes to close the canopy he must first manually unlock the canopy by moving the knob 58 upwardly into "Clear" position. In this position of knob 58, shaft 56 will be above the imaginary line 63 and lever 44 will remain in the "Clear" position to permit the canopy to close. It will be noted that movement of the knob 58 into "Clear" position depresses the free end of lever 44 to a point wherein it is completely withdrawn from the channel shaped track 30. At the same time the trip lever 52 which is carried by the other end of lever 44 is elevated into a position in which its trip arm 66 projects through the aperture 68 in web 41, web 33, leg 31, and channel 30 so that it is in the path of bracket 28 as the latter moves forward. Engagement of bracket 28 with arm 66 causes trip lever 52 to move counterclockwise (Fig. 2) about its pivot 54 until it engages stop pin 61 during which movement its toe 64 engages the end of spring 60 on shaft 56 and depresses the shaft into "Blocked" position in which the shaft 56 is in the lower end of slot 74 and the abutment 50 is again in canopy blocking position.

It will be evident that as a result of this invention it has been made possible to positively secure the sliding section of a cockpit cover in the open position entirely independently of the actuating mechanism for moving the section between closed and open positions. It will be further evident that by this invention means have been provided by which this locking mechanism is automatically reconditioned by the closing movement of the sliding section so that upon subsequent opening positive locking of the movable section automatically takes place.

While only one embodiment of the invention has been shown and described herein, it will be evident that various changes in the construction and arrangement of the parts are possible without departing from the scope of the invention as defined in the claims.

What is claimed and is desired to be secured by Letters Patent is:

1. In an aircraft having a cockpit, the combination of a sliding canopy section for said cockpit, actuating means for moving said section between closed and open positions thereof, manually releasable locking means for positively locking said section in open position, and means operative as a result of the closing movement of said section by said actuating means for resetting said locking means into a position for automatically locking said section when the latter is again moved to open position.

2. In an aircraft having a cockpit, the combination of a sliding canopy section for said cockpit, pilot controlled means for moving said section between cockpit closed and cockpit open positions thereof, a manually operable locking member movable between blocked and clear positions for positively locking and unlocking said section when the latter is in its open position, means for holding said locking member selectively in its clear or blocked positions, and means for automatically moving said locking member from its clear position into its blocked position in response to movement of said section from open to closed position including a trip member carried by said locking member and having a portion thereof disposed in the path of movement of said section during the closing movement of the latter whenever said locking member is in clear position.

3. In an aircraft having a cockpit, the combination of a sliding canopy section for said cockpit, pilot controlled means for moving said section between closed and open positions, a lever pivoted on fixed structure of said cockpit having a free end thereof movable into section locking position in which it is disposed in front of said section when the latter is in open position, manual means for moving said lever to unlock said section, and means responsive to closing movement of said section for automatically swinging said lever about its pivot into section locking position when said section is again moved to its open position.

4. In an aircraft having a cockpit, the combination of a track carried by said cockpit, a sliding canopy section for said cockpit having a wheeled support movable on said track, pilot controlled means for moving said section between closed and open positions, and means operable by the pilot independently of said first mentioned means for positively locking said section in its open position including a bracket carried by said cockpit, a stop member pivoted on said bracket having a free end comprising an abutment, means for moving said stop member into a canopy locking position in which its abutment positively blocks the movement of said section from open to closed position of the latter, and a trip lever pivotally mounted on said stop member and engageable by said wheeled support as the canopy section is moved toward its closed position for automatically moving said stop member into position to lock said canopy section whenever the latter is again moved into its open position.

5. In an aircraft having a cockpit, the combination of a sliding canopy section for said cockpit having a wheeled support, means controlled by the pilot for moving said section between closed and open positions, means for positively locking said section in its open position including a bracket carried by said cockpit, a stop member pivoted on said bracket having a free end comprising an abutment, manually operable means for moving said member between a canopy blocking position in which its abutment is in front of said wheeled support in position to block the movement of said section from its open position and a canopy clear position in which its abutment is out of the path of movement of said wheeled support, and a trip lever pivotally mounted on said stop member and engageable by said wheeled support as the canopy section is moved to its closed position for automatically moving said stop member into position to block said canopy section whenever the latter is again moved into its open position.

6. In an aircraft having a cockpit, the combination of a sliding canopy section for said cockpit having a wheeled support, a track on which said section slides, pilot controlled means for moving said section between closed and open positions thereof, and means for positively locking said section in its open position independently of said first mentioned means including a bracket carried by said cockpit adjacent said track, a stop member pivoted on said bracket having a free end comprising an abutment, manually operable means for moving said member into a canopy blocking position in which its abutment is in position to engage said wheeled support in the open position of said section, and a pivotally mounted trip lever engageable by said sliding section as the latter is moved to its closed position having means for moving said member into blocking position.

7. In an aircraft having a cockpit and a sliding canopy section which is movable to open and close said cockpit, the combination of mechanism for locking said sliding section including a locking member carried by a fixed part of the aircraft for holding said section fixed in the open position of the latter, manually operable means for retracting said member to release said section for closing movement, and means operative in response to closing movement of said section for moving said locking member into position for automatically locking said section when the latter is again moved to open position.

MORRIS E. ROTH.

REFERENCES CITED

The following references are of record in the file of this patent:

UNITED STATES PATENTS

| Number | Name | Date |
| --- | --- | --- |
| 1,682,229 | Joyce | Aug. 28, 1928 |
| 2,125,752 | Saulnier | Aug. 2, 1938 |
| 2,280,368 | Bassett | Apr. 21, 1942 |
| 2,361,113 | Lobelle | Oct. 24, 1944 |
| 2,367,075 | Ulmer et al. | Jan. 9, 1945 |